No. 883,774. PATENTED APR. 7, 1908.
F. C. AVERY.
POWER TRANSMISSION DEVICE FOR MOTOR VEHICLES.
APPLICATION FILED MAR. 9, 1904.
2 SHEETS—SHEET 1.
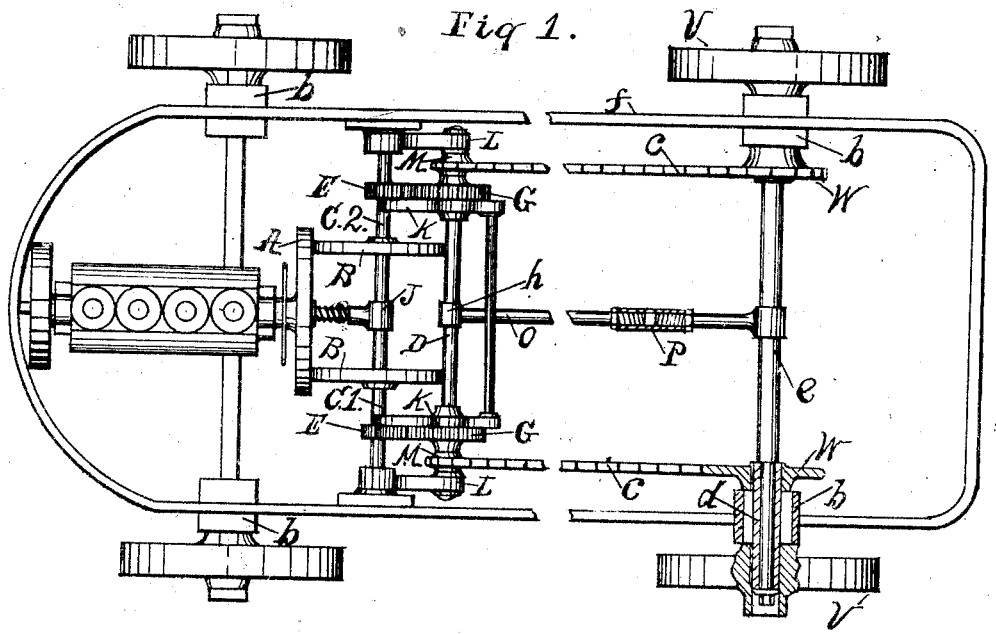
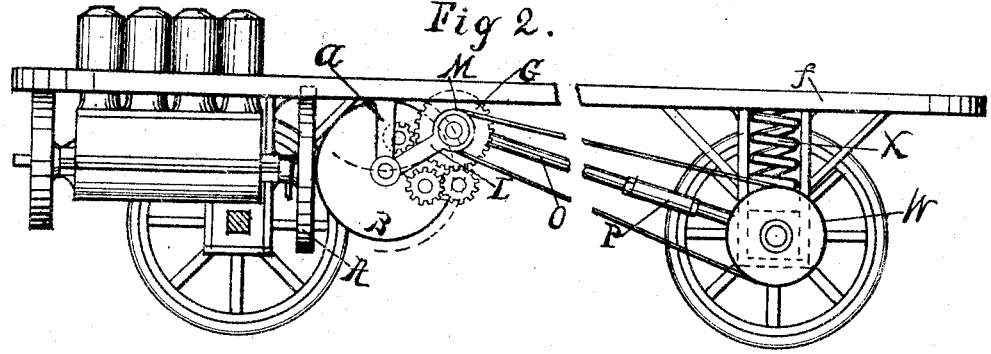
Witnesses
Luther D. Shely
F. H. Avery
Inventor.
F C Avery.

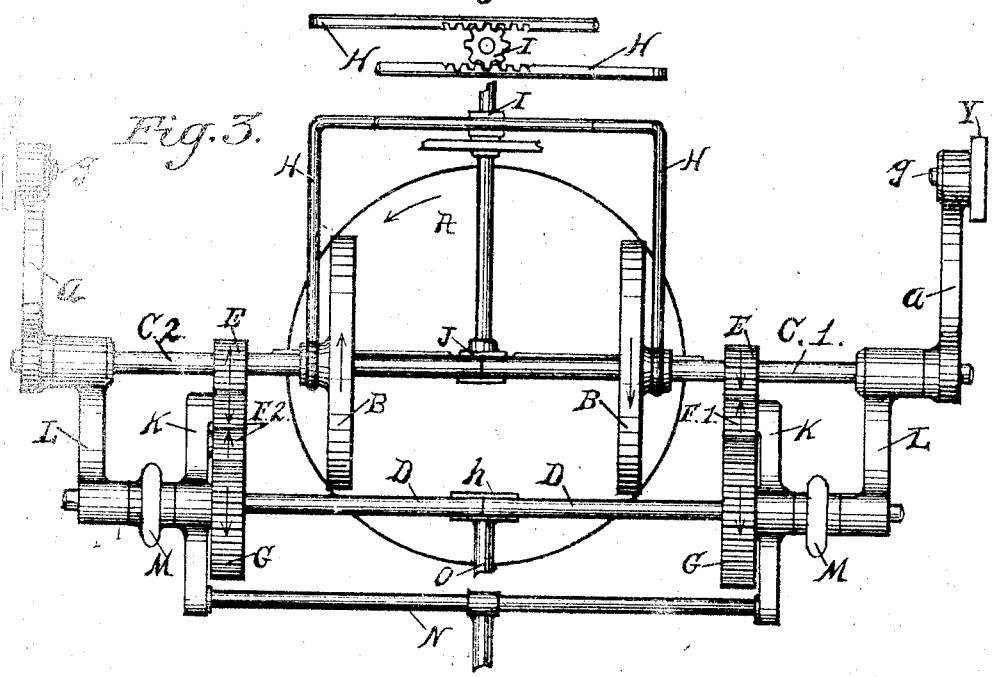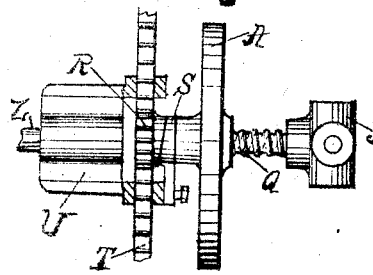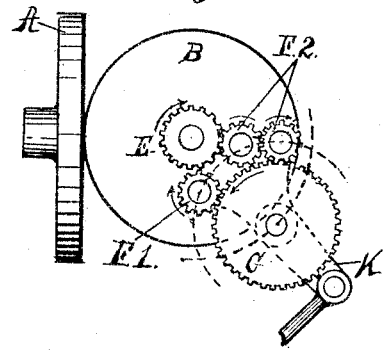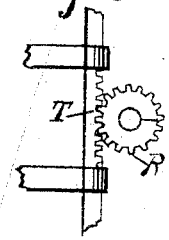

UNITED STATES PATENT OFFICE.

FREDERICK C. AVERY, OF HARVEY, ILLINOIS.

POWER-TRANSMISSION DEVICE FOR MOTOR-VEHICLES.

No. 883,774.      Specification of Letters Patent.      Patented April 7, 1908.

Application filed March 9, 1904. Serial No. 197,289.

*To all whom it may concern:*

Be it known that I, FREDERICK C. AVERY, a citizen of the United States, residing at Harvey, in the county of Cook and State of Illinois, have invented a certain new and useful Improvement in Power-Transmission Devices for Motor-Vehicles, the object of which is to provide a simple and effective running-gear and also a convenient plan of the arrangement of the motor and transmission parts, in order to give the most room for the conveying capacity of the vehicle.

The accompanying drawings show the frame wheels and springs adapted for heavy vehicle work such as: coaches, trucks, etc. but the motor and transmission parts as shown will apply to any style of vehicle.

Figure 1 represents a plan view of the motor vehicle frame showing the location of the motor and the driving gear construction. Fig. 2 is a side elevation of the same. Fig. 3 is a view of the driving mechanism showing the method of converting a double opposite rotary motion into a single rotary motion, in either direction. Fig. 3$^a$, shows a gear located between two rack rods in such a way that a rotating movement of the gear will give motion to the rack rods in opposite directions to each other. Fig. 4 shows a method of forcing the driving friction disk in and out of contact with the driven friction wheels. Fig. 5 is a side view of the driving mechanism showing the method of reversing the motion of the driven parts. Fig. 6 is a side view of the rack and pinion cam shown in Fig. 4.

An ordinary type of hydro-carbon motor is shown in Fig. 1 and Fig. 2 from which power is transmitted to the running gear by means of a friction device as hereinafter described.

Similar letters of reference indicate the same parts in the several figures of the drawings.

The friction disk A. driven by the motor transmits a rotary motion to the friction wheels B. B. one in an opposite direction to the other as shown by the indicator marks in Fig. 3. The wheels B. B. are arranged to slide on the shafts $C^1$ and $C^2$ but they are held in place by a feather in order to receive a sliding motion on the shafts $C^1$ and $C^2$. The shafts $C^1$ and $C^2$ show a division at the journal J. in Fig. 3. The shafts D. D. are also shown divided at the journal $h$. in order to provide for the double driving system of transmission as hereinafter described. In case a single driving sprocket M. with a single chain $c$. is used in connection with a single driven sprocket W. attached to the usual compensating gears with the divided rear axle, then there will be no division at the journal $h$. but a single rotating shaft will take the place of the two shafts D. D.

The driving pinions E. E. are fastened to the shafts $C^1$ and $C^2$. The driven gears G. G. are fastened to the shafts D. D. A single intermediate gear $F^1$ is located between one pinion E. and one gear G. and the double intermediate gears $F^2$ are located between the other pinion E. and the gear G.

It is shown by the indicator marks in Fig. 3. and Fig. 5. that the opposite rotary motion of the shafts $C^1$ and $C^2$ is transmitted by means of the trains of gears to a single rotary motion of the shafts D. D. in one direction. The driving sprockets M. M. are fastened to the shafts D. D. and by means of the chains $c$. $c$. motion is given to the driven sprockets W. W. which are rigidly connected with the vehicle driving wheels V. V. in such a way that they revolve with the axle $e$. The intermediate gears $F^1$ and $F^2$ are pivoted on the bracket K. which is arranged to swing on the shafts D. D. and the brackets K. K. are held in place by a connecting bar N. in order to allow them to swing together with the same motion.

On each side of the pinions E. E. and the gears G. G. is located on the brackets K. K. a single intermediate gear $F^1$ and the double intermediate gears $F^2$, the set on one side being out of contact while the set on the other side is in contact. These intermediate gears are held in place and also given the swinging motion by the brackets K. K. It will be seen by referring to Fig. 5. that this arrangement of gearing will give a reverse motion to the shafts D. D. by simply swinging the brackets K. K. as described by means of the bar N. This reverse motion of gearing is much the same as the reverse feed motion of the common type of engine lathe, there being two sets of gears instead of one for the reason stated. It is evident that the brackets K. K. may be arranged to swing concentric with the shafts C¹ and C² instead of the shafts D. D. as described and the effect will be the same.

It will be seen by referring to Fig. 3. and Fig. 1. that motion is applied to each of the vehicle driving wheels V. V. through an independent transmission of power from the disk A. in such a way that if one of the driving wheels V. V. should travel further than the other a slip will take place at the friction contact between the disk A. and the wheels B. B. thus performing the same function as the usual compensating gears and split axle in motor vehicle construction. It will also be seen by referring to Fig. 3. that the shafts C¹ and C² are connected with the frame blocks Y. Y. by means of the hangers a. a. These hangers are arranged to swing on the frame blocks Y. Y. in such a way that the friction wheels B. B. may be brought in and out of contact with the friction disk A. This movement may be controlled by a suitable lever not shown. It is also shown that the shafts D. D. are supported from and are arranged to swing concentric with the shafts C¹ and C² to a suitable position as shown. The distance between the rear axle e. and the shafts D. D. is determined by the length of the reach rod O. This distance may be altered to suit the length of the chain c. by means of the nut P. The nut P. is provided with a right and left hand thread for the purpose mentioned. It is also apparent from this arrangement of the swinging connection of the hangers L. L. to the shafts C¹ and C² and controlled by the reach rod O. (which is journaled to the shafts D. D. and connected concentric with the driven sprockets W. W.) that any change of load on the frame f. that may cause the axle springs X. to move up or down will not effect the distance between the sprockets M. M. and W. W.

To change the speed of the transmission parts in reference to the friction disk A. it is necessary to slide the friction wheels B. B. along the shafts C¹ and C². I have provided for this by means of the rack rods H. H. which are operated by a movement of the pinion I. as shown in Fig. 3ª. In order to bring the friction disk A. in and out of contact with the wheels B. B., I have shown in Fig. 4. the disk wheel A. which is arranged to slide on the motor shaft Z. a feather being provided in order to transmit rotary motion to the disk A.

The letter R. represents a pinion or revolving cam operated by a rack rod T. and engaging with a stationary cam S. The pinion cam R. and the stationary cam S. are fitted loosely on the motor shaft Z. The stationary cam S. is prevented from turning by a fastening to the box U. as shown. The spring Q. forces the disk wheel A. in contact with the pinion cam R. It is evident that any movement of the rack rod T. will cause the disk A. to slide on the motor shaft Z.

In order to provide a convenient arrangement for the transmission parts in connection with the motor as described I have been obliged to construct a form of frame that will locate the motor well in front of the vehicle or forward part of the frame. Here a suitable housing may be provided to protect the motor from dust and this same covering may be used to protect the vehicle operator.

Having described my invention what I claim and desire to secure by Letters Patent is:—

1. In a power transmission device, a friction disk, two wheels in friction contact with said disk and rotating in opposite directions, two shafts driven by said wheels, a gear attached to each of said shafts, two driven shafts, two driven gears mounted thereon, two swinging hangers mounted concentric with the two first mentioned shafts, said hangers supporting the driven shafts, two swinging brackets, a single intermediate gear attached to one bracket, two intermediate gears attached to the other bracket, and said brackets arranged to swing in order to move the intermediate gears in and out of contact with the driven gears as herein shown and described.

2. In a power transmission device, a power driven shaft, a friction disk mounted thereon, two friction wheels, a shaft mounted in each of said friction wheels and revolving with said wheels, said friction wheels being free to slide lengthwise on their mounted shafts, means for moving said disk in contact with said wheels in order to rotate said wheels in opposite directions to each other as herein shown and described.

3. In a power transmission device, a friction disk, two wheels rotated in opposite directions thereby, two shafts revolving with said wheels, two gear driven shafts revolving in the same direction, means connecting said gear driven shafts with the opposite rotating shafts, a driving sprocket attached to each of said gear driven shafts, two vehicle driving wheels, a driven sprocket rigidly attached to each of said vehicle driving wheels, chains connecting said driving and driven sprockets, and all in order to give motion to the vehicle wheels as herein shown and described.

4. In a power transmission device, a power driven shaft, a friction disk revolving with and free to slide lengthwise on said shaft, a pressure spring in contact with said disk, a stationary cam, a movable cam in working contact with said stationary cam in order to give a sliding movement to said disk lengthwise of said shaft as herein shown and described.

5. In a power transmission device, a power driven shaft, a friction disk revolving with and free to move lengthwise on said shaft, a pressure spring in contact with said disk, a stationary cam, a movable cam in working contact with said stationary cam, a gear operating said movable cam, a rack rod adapted to move said gear, and all in order to give a sliding movement to said disk on its driven shaft as herein shown and described.

FREDERICK C. AVERY.

Witnesses:
L. D. SHELY,
F. H. AVERY.